Patented Sept. 27, 1949

2,483,137

UNITED STATES PATENT OFFICE 2,483,137

SYNTHESIS OF VITAMIN B6

Stanton A. Harris, Westfield, N. J., assignor to Merck & Co., Inc., Rahway, N. J., a corporation of New Jersey No Drawing. Application January 10, 1946, Serial No. 640,391

6 Claims. (Cl. 260—297.5)

This invention relates to a process for the preparation of novel chemical compounds; in a particular sense it is concerned with the preparation of intermediates useful in the synthesis of vitamin B6 (2-methyl-3-hydroxy-4,5-di(hydroxymethyl)pyridine).

This application is a continuation-in-part of the co-pending application by the same inventor Serial No. 428,080, filed January 24, 1942, issued June 17, 1947, as Patent No. 2,422,195, which is a division of Serial No. 293,131, filed September 1, 1939, issued February 10, 1942, as Patent No. 2,272,198.

According to one embodiment of the present invention amino compounds of the formula:

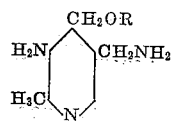

wherein R is alkyl aryl and aralkyl when diazotized with nitrous acid or a nitrite under acidic conditions yield compounds of the formula:

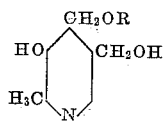

wherein R is as above. The hydrohalide salts of these compounds can be hydrolyzed to obtain vitamin B6 hydrohalide.

In general, the process comprises reacting a dihydrohalide of 2-methyl-3-amino-4-alkoxymethyl-5-aminomethylpyridine with nitrous acid or under acidic conditions with a nitrite to yield 2-methyl-3-hydroxy-4-alkoxymethyl-5-hydroxymethylpyridine. The hydrohalide salt of the latter compound when heated with dilute hydrohalic acid and water at 150° C. yields vitamin B6 hydrohalide.

The following example illustrates a specific method of carrying out the present invention, but it is to be understood that this example is given by way of illustration and not of limitation.

Example

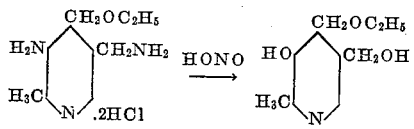

300 grams of 2-methyl-3-amino-4-ethoxymethyl-5-aminomethylpyridine dihydrochloride are dissolved in 430 cc. of water, neutralized with sodium hydroxide in phenolphthalein and 540 grams sodium nitrite are added. This solution is added slowly to 6500 cc. of hot (90° C.) 2 N sulfuric acid with stirring. There is an immediate evolution of nitrogen, followed by the formation of a slightly yellow solution. The solution is heated for an additional 15 minutes, treated with just enough urea to decompose the excess nitrous acid, cooled, and neutralized to pH 7.2 with sodium hydroxide solution, using bromothymol blue as an outside indicator. The slightly reddish solution is concentrated under diminished pressure until sodium sulfate starts to separate. At this point a black, oily layer is formed, which contains most of the desired product. It is dissolved in 2¼ kg. acetone, filtered from separated sodium sulfate, and evaporated to dryness. The residue is then redissolved in 2¼ kg. of acetone, filtered from the separated sodium chloride, and evaporated to dryness. It is taken up a third time in 2¼ kg. of acetone, filtered from an insoluble material and diluted with an equal volume of ether, whereupon a dark red oil separates. The supernatant liquid is decanted and filtered with the aid of carboraffin (an activated charcoal). The slightly yellow solution is evaporated to a syrup; yield of 2-methyl-3-hydroxy-4-ethoxymethyl-5-hydroxymethylpyridine is 120 grams or about 50% of the theory. Additional material can be obtained from the precipitated oil and by elution of the charcoal with acetone.

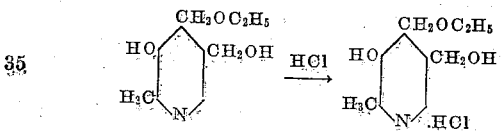

Fifty grams of the above material are dissolved in 500 cc. of acetone and treated with dry hydrogen chloride until the solution is acid to wet Congo paper whereupon a brown colored hydrochloride crystallizes out. The addition of ether yields some additional crystals. These crystals are twice recrystallized by dissolving in a minimum of alcohol and adding an equal volume of acetone and filtering with the aid of carboraffin. The yield is 25.3 g. or 21.5% of the theory based on the original diamine; M. P. 135–136° C. Additional crystals may be obtained from the mother liquors.

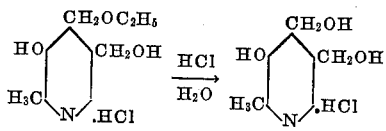

0.4 gram of 2-methyl-3-hydroxy-4-ethoxymethyl-5-hydroxymethylpyridine hydrochloride is dissolved in 40 cc. of water containing 2 cc. of 2.5 N hydrochloric acid and the solution is heated in a bomb tube at 155–160° C. for three hours. After cooling, the tube is opened and the contents are evaporated to dryness on a steam bath under reduced pressure. The crystalline residue is recrystallized from 95% alcohol, using charcoal for clarification; melting point 206–207° C., mixed melting point with analytically pure vitamin B6 shows no depression. The yield is 2.81 grams or 80% of theory.

In like manner 2-methyl-3-amino-4-benzyloxymethyl-5-aminomethylpyridine is treated with nitrous acid or a nitrite under acid conditions to yield 2-methyl-3-hydroxy-4-benzyloxymethyl-5-hydroxymethylpyridine. The hydrohalide salt of the latter compound is hydrolyzed and vitamin B6 hydrohalide is recovered.

2-methyl-3-amino-4-phenoxymethyl-5-aminomethylpyridine is treated with nitrous acid or a nitrite under acidic conditions to yield 2-methyl-3-amino-4-phenoxymethyl-5-hydroxymethylpyridine. The hydrohalide salt of the latter compound is hydrolyzed and vitamin B6 hydrohalide is recovered.

Modifications may be made in carrying out the present invention without departing from the spirit and scope thereof, and I am to be limited only by the appended claims.

I claim:

1. In the synthesis of vitamin B6, the steps which comprise diazotizing and hydrolyzing 2-methyl-3-amino-4-alkoxymethyl- 5 -aminomethylpyridine dihydrohalide, recovering the 2-methyl-3-hydroxy-4-alkoxymethyl-5-hydroxymethylpyridine thus formed, reacting the latter compound with a hydrogen halide in the presence of an organic solvent, recovering the 2-methyl-3-hydroxy-4-alkoxymethyl- 5 -hydroxymethylpyridine hydrohalide thus formed and hydrolyzing the latter compound with a dilute acid solution at a temperature and pressure sufficient to form a 2-methyl-3-hydroxy-4,5-di(hydroxymethyl) pyridine hydrohalide.

2. In the synthesis of vitamin B6, the steps which comprise reacting an aqueous solution of 2-methyl-3-amino-4-alkoxymethyl-5-aminomethylpyridine with nitrous acid in acid solution, recovering the 2-methyl-3-hydroxy-4-alkoxymethyl-5-hydroxymethylpyridine thus formed, reacting the latter compound with hydrogen halide in the presence of an organic solvent, recovering the 2-methyl-3-hydroxy-4-alkoxymethyl-5-hydroxymethylpyridine hydrohalide thus formed, reacting the latter compound with a dilute hydrochloric acid solution for a time and at a temperature and pressure sufficient to effect hydrolysis, and recovering the 2-methyl-3-hydroxy-4,5-di(hydroxymethyl)pyridine hydrochloride thus formed.

3. In the synthesis of vitamin B6, the steps which comprise neutralizing an aqueous solution of 2-methyl-3-amino-4-ethoxymethyl-5-aminomethylpyridine dihydrochloride with sodium hydroxide, adding sodium nitrite, pouring the solution into hot sulfuric acid, recovering the 2-methyl-3-hydroxy-4-ethoxymethyl-5-hydroxymethylpyridine thus formed, dissolving the 2-methyl-3-hydroxy-4-ethoxymethyl- 5 -hydroxymethylpyridine in acetone, reacting said acetone solution with dry hydrogen chloride, to precipitate the 2-methyl-3-hydroxy-4-ethoxymethyl-5-hydroxymethylpyridine hydrochloride thus formed, reacting the latter compound with dilute hydrochloric acid solution in a closed vessel for about three hours at about 155–160° C., and recovering the 2-methyl-3-hydroxy-4,5-di(hydroxymethyl) pyridine hydrochloride thus formed.

4. In the synthesis of vitamin B6, the step which comprises diazotizing and hydrolyzing 2-methyl-3-amino-4-alkoxymethyl- 5 -aminomethylpyridine dihydrohalide and recovering the 2-methyl-3-hydroxy-4-alkoxymethyl-5-hydroxymethylpyridine thus formed.

5. In the synthesis of vitamin B6, the step which comprises reacting an aqueous solution of 2-methyl-3-amino-4-alkoxymethyl-5-aminomethylpyridine with sodium nitrite in the presence of a hot mineral acid and recovering the 2-methyl-3-hydroxy-4-alkoxymethyl-5-hydroxymethylpyridine thus formed.

6. In the synthesis of vitamin B6, the step which comprises reacting 2-methyl-3-hydroxy-4-alkoxymethyl-5-hydroxymethylpyridine hydrochloride with a dilute hydrochloric acid solution for a time and at a temperature and pressure sufficient to effect hydrolysis and recovering the 2-methyl-3-hydroxy-4,5-di(hydroxymethyl)pyridine hydrochloride thus formed.

STANTON A. HARRIS.

REFERENCES CITED

The following references are of record in the file of this patent:

FOREIGN PATENTS

| Number | Country | Date |
| --- | --- | --- |
| 543,615 | Great Britain | Mar. 6, 1942 |

OTHER REFERENCES

J. A. C. S. (1941), vol. 63, pages 3363–3367.